United States Patent Office 2,784,068
Patented Mar. 5, 1957

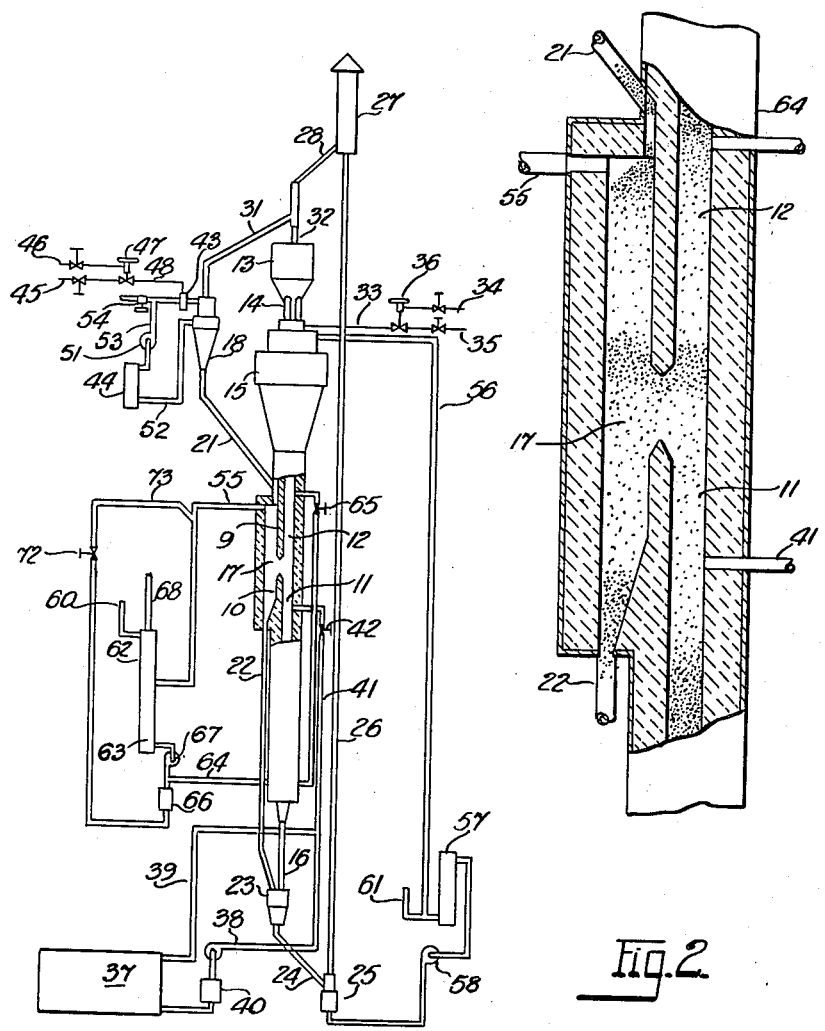

2,784,068

THERMOLYTIC AND PYROLYTIC GAS GENERATION

Donald Beggs and Theodore F. Loughry, Toledo, Ohio, assignors to Surface Combustion Corporation, Toledo, Ohio, a corporation of Ohio Application May 28, 1953, Serial No. 358,002

1 Claim. (Cl. 48—74)

This invention relates to the thermolytic and pyrolytic generation of gas from normally liquid hydrocarbons by contacting the hydrocarbons on hot bodies in a reaction zone and delivering the products of the reaction from the reaction zone. More particularly, the invention relates to a method and means for conducting such operations in a moving bed pebble heater having a hot pebble reaction zone for thermally cracking the hydrocarbons and a cooler pebble quench zone for cooling cracking reaction products and for disengaging generated gas from the pebbles.

In the thermal cracking of hydrocarbons, the reaction products are generally a mixture of solids, liquids and gases. Liquids and solids, predominantly carbon at the higher temperatures, are deposited on the pebbles and may be carried from the reaction zone as a coating on the pebbles. The coating may dry if the time to and temperature of discharge of the pebbles are great enough. Vapors leave the reaction zone otherwise than as a coating on the pebbles at the reaction temperature, but upon cooling and in time many liquids or solids may be deposited from the vapors. Attempts to discharge such vapors through a pipe from above the hot reaction zone have been met with troublesome deposits of hard coke, semi-solid or heavy liquid pitch, gums, tars and the like, together with liquids which plug the off-take pipe and stop the operation.

Such deposits in troublesome areas are avoided by utilizing the surface of cool pebbles as condensing surfaces, and by controlling the thickness of the deposit, further drying or cracking of the coating, and replacing the coated pebbles with other cool pebbles to quench the gas and avoid much gum formation. Control of this pebble quench operation depends upon many variables, and any change in one of many factors of temperature, pressure or quantity flows may completely disrupt the whole gas generation operation.

According to the present invention rapid heating and cracking of the hydrocarbons and prompt quenching of reaction products are obtained by two continuously moving beds of solid, granular heat transfer material, or pebbles, which may be carbon balls from ¼ to ¾ inch diameter. The rates of pebble flow in the beds may be individually controlled. The cracking stream or bed of hot pebbles moves through a contacting zone where they receive the hydrocarbons and heat them before passing from the reacting zone. It is preferred to proportion the hydrocarbon feed flow to the pebble temperature and flow so that the pebbles leave the reaction zone dry. The second, quench bed of pebbles is brought into contact with the first bed to permit hydrocarbon vapors to pass from the first bed to the second bed, and the two beds of pebbles are then again separated and separately discharged. The rates of flow of pebbles through the beds are separately controlled by pebble flow control means below the beds.

Under ideal operating conditions for purposes of heat conservation, the gas leaving the pebble quench will be at the temperature of the incoming pebbles, and the pebbles leaving the quench chamber will be at the reaction chamber temperature as it exists at the cross-over. This is called a "balanced-blow" or a "perfect-blow." If the flow of quench pebbles is decreased from a balanced-blow flow, then the entering quench pebbles will be heated to reaction temperature, but the gas will not be cooled to the entering quench pebble temperature. This is called an "over-blow," because the ratio of gas flow to pebble flow is greater than for a balanced-blow. With an over-blow, the pebbles reach reaction temperature, hence admixture therewith is in theory not harmful, the source of the heat being immaterial. However, uniformity of temperature throughout a pebble bed is extremely difficult to maintain, and a stream of slightly cooler pebbles in the reaction chamber causes greater gas flow through the cold path, thus further cooling the path and resulting in gas channeling and inadequate cracking.

In the quench chamber in an over-blow, to attain the desired exit gas temperature the pebbles must be initially supercooled. For example, it may be necessary to introduce quench pebbles at 600° F. to quench the gas to 800° F. This is an extremely difficult condition to control to maintain constant quench temperature for gas leaving the quench chamber. It is highly unstable, and entirely unsuited to a process where the exit gas temperature must be controlled and the volume of gas produced in the reaction zone is subject to change.

On the other hand, if the flow of quench pebbles is proportionately increased over a balanced-blow, the pebbles may only rise from 800° F. to 1400° F. while the gas cools from 1550° F. to 800° F. This is an under-blow, and provides a very stable gas outlet temperature, but a very unstable average pebble temperature at the cross-over. Cooler pebbles cannot be allowed to enter the reaction chamber if control of the reaction is to be maintained unless perfect mixing of pebbles is obtained together with time for them to reach a uniform average temperature before contact with the hydrocarbons.

In the present invention, the stability of the under-blow may be used to maintain very accurate control over the exit gas temperature with no colder pebbles delivered to the reaction chamber, hence channeling of gas flow therein is avoided. By proper design or control, a small portion of the quench pebble stream may be diverted through the cross-over into the primary reaction chamber, since locally the quench pebble stream is over-blown adjacent the cross-over due to cross-flow heat exchange, and thus the efficiency in heating is improved. These and other advantages of the invention will become apparent upon further study and comparison with the prior art.

For a consideration of what we believe to be novel and our invention, attention is directed to the following portion of this specification and the drawing and concluding claim thereof.

In the drawing:

Fig. 1 is a diagrammatic elevation of apparatus for conducting the process.

Fig. 2 is an elevation in section of a portion of the apparatus of Fig. 1.

Referring to the drawing, a reaction chamber or zone comprising primary and secondary portions 11 and 12 contains pebbles, preferably hard carbon balls of diameters ranging from ¼ to ¾ inch. These pebbles are delivered from a surge hopper 13 through pipes 14 to a heater 15 wherein the pebbles are heated to the desired temperature, thence to the reaction chamber 12, 11 and out through a discharge pipe 16.

Adjacent to the reaction chamber is a quench chamber 17 which receives pebbles from a hopper 18 and delivery pipe 21 and delivers pebbles through a discharge pipe 22.

The reaction and quench chambers may be considered as a single chamber whose upper portion is divided by a vertical depending wall 9 and whose lower portion is divided by a vertical upstanding wall 10 aligned with wall 9 to form substantially individual, continuous beds of pebbles on either side of said walls.

Pebbles from the reaction chamber 11, 12 and from the quench chamber 17 are delivered through a flow controlling or proportioning device or box 23 and thence by a pipe 24 to an elevator, or gas lift. A controlled gas lift nozzle in a lift pot 25 transports the pebbles through lift pipe 26 and deceleration chamber 27 to a high point in the pebble circuit, from which the pebbles descend by gravity through pipes 28, 31 and 32 to the surge hopper 13 and the hopper 18.

The gas preferred for the gas lift is flue gas drawn from the heater 15 through pipe 56, cooler 57 and blower 58, excess flue gas being vented at 61.

The rates of draw off of pebbles from the reaction and quench chambers are in effect individually controlled, preferably by proportioning quench pebble flow to reactor pebble flow in the box 23, and controlling total flow by the lift pot 25.

In the heater 15 the pebbles are heated to the desired temperature, which may vary according to the liquid feedstock being cracked, the product gas analysis desired, the rate of flow of pebbles and many other factors, generally about 1400 to 1600° F. in normal processing for pebbles leaving the heater 15. Heating is accomplished by flue gases circulated therethrough. The upper temperature limit is affected by economics of heating, because above about 1800° F. pebble temperature in the heater the flue gas equilibrium between CO and $CO_2$ in the presence of carbon becomes unfavorable due to conversion of flue products to CO. The lower temperature limit will be affected by conditions which allow pebbles to leave the reaction chamber wet, or too wet to flow properly, usually about 1000° F. The flue gases in the heater are generated by burning a fuel and air mixture from pipe 33, the mixture being formed from fuel pipe 34 and air pipe 35 by a regulator 36.

In some cases it is preferred to close the fuel valve in fuel pipe 34 and operate the air valve in pipe 35 by temperature control apparatus responsive to the temperature of the pebbles heated, utilizing fuel in pipe 34 for initially heating the pebbles and thereafter using the carbon deposited on the pebbles as the fuel for heating. It is understood, of course, that over and under sized pebbles may be screened from the system, preferably between the chamber 27 and the heater 15.

Hot pebbles from the heater 15 enter the reaction chamber and form a pebble-flooded system, or bed, and progress downward to receive a cracking feedstock from pipe 41. The cracking stock may be any heavy hydrocarbon such as Bunker-C fuel oil, hot tars, or other petroleum products which can be piped. It is stored in a feedstock storage tank 37 and is moved through pipes 38 and 41 and control valve means 42 (which may be a metering pump) to the primary reaction chamber 11 where it contacts the hot pebbles in the reaction chamber. Feedstock temperature is controlled by a heater 40 and by recirculation of a stream through pipe 39. In the production of a natural gas equivalent having about 1000 B. t. u. heat value from Bunker-C fuel oil, an initial reaction temperature in the primary chamber 11 of about 1550° F. may be used. The reaction products will include normally gaseous hydrocarbons, free carbon, and condensables. Free carbon will deposit on the pebbles leaving the reaction chamber, and the vapors or gases will pass through a cross-over connection between the reaction chamber and the quench chamber between walls 9 and 10. The pebbles entering the quench chamber 17 from the hopper 18 are heated or cooled in the hopper 18 by recirculating a flue gas stream therethrough and through a heater 43 and a cooler 44 to maintain a desired quench pebble temperature. In practice these pebbles are initially heated during starting up operations, then cooled during normal operations. The heater 43 is supplied by fuel pipe 45 and air pipe 46, through mixer 47 and pipe 48. An adequate supply of flue gas may be assured by a minimum flow of coolant through the cooler 44. The flue gas is circulated by a blower 51 through the heater 43, hopper 18, cooler 44 and pipes 52 and 53, and a suitable pressure is maintained by a vent regulator 54.

The cracking feedstock is delivered to the reaction chamber 11 by pipe 41 where it contacts hot pebbles and is cracked. Hydrocarbon vapor is formed and flows initially countercurrent to the pebble stream, and a residue is left on the pebbles. With adequate time and proportionately high enough pebble flow, the residue is dry when the pebbles leave the reaction chamber, and the pebble temperature upon leaving will generally be over 1000° F. Loss of the vapors through pipe 16 and to heater 15 is prevented by the usual steam seals and pressure control, not shown. The vapors pass from the contact chamber 11 between the walls 9 and 10 and into the quench pebble stream in the quench chamber 17. These vapors initially flow across the quench pebble stream, then flow countercurrent thereto to the top of the bed, where the remaining gas disengages from the bed and is discharged through pipe 55.

As the vapors pass rapidly upwardly through the pebbles in the quench chamber, they are cooled and condensables deposit out upon the pebbles. The condensables then pass slowly downward with the bed and in time further crack. The pebbles are discharged substantially dry through pipe 22. In a balanced-blow the quench bed pebbles should reach the temperature of the gas entering the quench pebble bed, but in an under-blow, the pebbles may leave in the pipe 22 at 1250° F. when the reaction temperature is 1550° F. When running an under-blow it is preferred to provide a substantial time for the pebbles to dry in the quench chamber after leaving the cross-over between walls 9 and 10, the lower the exit temperature the longer the time required to dry the quench pebbles. In a balanced-blow, or nearly so, the pebbles will be dry upon or very soon after reaching reaction temperature.

The quench pebbles entering the quench chamber are maintained between 600 and 1000° F., preferably about 750° to 800° F. Cooling the gases to such temperature will prevent the depositon of tars, gums and like materials in off-take pipe 55, and disengaging surfaces above quench pebbles in quench chamber 17. The condensables that condense at temperatures above the inlet pebble quench temperature wet the quench pebbles and then generally further crack and dry as the quench pebbles move downward toward the discharge pipe 22. Thus most of the heavy gums and tars are cleaned from the gas before the gas reaches the gas pipe 55.

If the quench temperature is too high, the gas leaving through pipe 55 will contain pitch, tars and gums that will with time or cooling deposit in the pipe and disengaging area in the quench chamber and plug the gas outlet. If the temperature is too low an excessive quantity of material will be condensed in the quench chamber causing excessive refluxing action between cold pebbles entering and hot pebbles leaving the quench chamber. Flooding of the quench chamber, or excessive pressure buildup may result.

The quenched gas leaving the pebble quench chamber 17 in pipe 55 is delivered to a scrubber fractionating column or other conventional condensing means 62 wherein condensable vapors, oils and the like are removed, and the product gas in pipe 68 is then ready for any desired final treatment such as recovery of condensables, drying and delivery to use.

The heavy bottoms recovered from column 62 may be delivered in a stream through a pipe 64 and valve means 65 to the secondary reaction chamber 12 wherein they contact the pebbles at their hottest and vapors therefrom flow initially concurrently with the pebble stream, the temperature thereof being 50° to 100° F. or so higher than that in the primary reaction chamber, depending on proportionate flows of pebbles and condensed oils in pipe 64. Due to the use of the pebble quench, the bottoms from the column 62 have substantially no free carbon, hence may be recycled directly into the primary reaction chamber, and full cracking thereof will be obtained.

The column 62 is preferably operated by recirculating a portion of the condensables from the sump 63 through a heat exchanger 66 by pump 67, and through valve 72 and pipe 73 to the top of pipe 55 to serve to maintain the pipe 55 clear of secondarily polymerized materials. Lighter ends may be withdrawn in the usual way as by pipe 60.

We claim:

In an apparatus for thermolytic and pyrolytic treatment of hydrocarbons comprising a quench chamber having a substantially vertical opening, means for supplying a stream of pebbles at a controlled temperature to the quench chamber above the level of said opening, means for withdrawing pebbles from the quench chamber below the level of said opening, at a restricted rate to keep the quench chamber flooded with pebbles, a primary reaction chamber communicating with the quench chamber through said opening and extending downward below the level of said opening, a second means for supplying a stream of pebbles, at a controlled higher temperature, means for withdrawing pebbles at a restricted rate from the primary reaction chamber below the level of said opening, means for feeding a hydrocarbon to the primary reaction chamber below the level of said opening and means for withdrawing a gaseous product from the quench chamber at a point remote from said opening, in combination, a secondary reaction chamber which forms an upward extension of the primary reaction chamber and has its upper portion connected to the second pebble-supplying means, whereby the primary and secondary reaction chambers may be kept flooded with pebbles, means for continuously removing a high-boiling fraction from said gaseous product, and means for feeding such fraction to the secondary reaction chamber above the level of said opening.

References Cited in the file of this patent

UNITED STATES PATENTS

| | | |
|---|---|---|
| 2,511,813 | Lockwood | May 16, 1946 |
| 2,554,407 | Hepp | May 22, 1951 |
| 2,555,210 | Waddil | May 29, 1951 |
| 2,561,419 | Schutte | July 24, 1951 |
| 2,653,903 | Kilpatrick | Sept. 29, 1953 |
| 2,673,786 | Alleman | Mar. 30, 1954 |